United States Patent [19]
Shie et al.

[11] Patent Number: 6,166,389
[45] Date of Patent: Dec. 26, 2000

[54] APPARATUS HAVING A LIGHT SOURCE AND A SOL-GEL MONOLITHIC DIFFUSER

[75] Inventors: Rick L. Shie, Westlake Village; Jeffrey A. Laine, Redondo Beach; Gajendra D. Savant, Torrance, all of Calif.

[73] Assignee: Physical Optics Corporation, Torrance, Calif.

[21] Appl. No.: 09/139,380

[22] Filed: Aug. 25, 1998

[51] Int. Cl.[7] ................................................. G02B 5/32
[52] U.S. Cl. .................... 250/504 R; 359/15; 359/28; 359/599; 430/320
[58] Field of Search .................... 250/504 R; 359/15, 359/14, 22, 28, 599; 430/320, 1, 2

[56] References Cited

U.S. PATENT DOCUMENTS

| | | | |
|---|---|---|---|
| 5,151,917 | 9/1992 | Perilloux et al. | 372/102 |
| 5,365,354 | 11/1994 | Jannson et al. | 359/15 |
| 5,534,386 | 7/1996 | Petersen et al. | 430/320 |
| 5,850,300 | 12/1998 | Kathman et al. | 359/9 |

OTHER PUBLICATIONS

Shagam, R.N., Ph.D., "Light Shaping Diffusers™ Simplify Aircraft Inspection," *Photonics Spectra*, Nov. 1994.
Dusinberre, B., "Light Shaping Diffusers Enhance Depth–Finder Performance," *Laser Focus World*, Jun. 1995.
Szczesniak, S., & Shie, R., "Machine Vision for Semiconductor Manufacture," *Photonics Spectra*, Nov. 1995.
"Directional Turning Film™", Physical Optics Corporation, 1996, Brochure.
Giancola, S., "Hologrpahic Diffuser Makes Light Work of Screen Tests," *Photonics Spectra*, Aug. 1996.
Laine, J., "Mini Display," *Design News*, Dec. 15, 1997.
"Light Shaping Diffusers® Technical Data Sheet," Physical Optics Corporation, Jul. 1, 1998.
"Light Shaping Diffuser® Transmissive Thin Film Price List," Physical Optics Corporation, May 1, 1998.
"Light Shaping Diffuser® Transmission Kits Price List," Physical Optics Corporation, May 1, 1998.
"Light Shaping Diffuser® Transmission Sheet Price List," Physical Optics Corporation, May 1, 1998.

*Primary Examiner*—Kiet T. Nguyen
*Attorney, Agent, or Firm*—Nilles & Nilles, S.C.

[57] ABSTRACT

An apparatus for projecting light on to a predetermined area includes a light source and a transparent element disposed adjacent the light source where in the transparent element is made from a sol-gel type glass, quartz, or other optical material. A plurality of surface micro-structures integral in a surface of the transparent element are provided which both homogenize and control directionality of light passing form the light source through the transparent element. These micro-structures produce a predetermined pattern of highly transmissive, smoothly varying, non-discontinuous light in a predetermined direction which is suitable for any number of applications wherein a sol-gel material transparent element including the diffuser surface structures are particularly well suited.

22 Claims, 3 Drawing Sheets

APPARATUS HAVING A LIGHT SOURCE AND A SOL-GEL MONOLITHIC DIFFUSER

BACKGROUND OF THE INVENTION

1. Field of the Invention

The present invention relates generally to devices incorporating a source of light, and more particularly to a light source including to a lens cover or lamp cover manufactured from a sol-gel type material such as glass or quartz, which includes integral a surface diffuser which homogenizes, controls the direction of, and shapes light from the source with high transmission efficiency.

2. Description of the Related Art

Lighting technology continues to improve in many areas in lighting design to reduce the size of the devices as well as to increase light source efficiency and longevity. Many more recent light sources and designs provide greater amounts of light for longer periods of time and come in smaller packages when compared to lights of several years ago. These improved light sources however, generate much more heat during operation which can cause damage to objects surrounding the light sources as well as components attached to the light source.

Therefore, in designing light sources for many applications, the housing structures surrounding the light sources, the products utilized to direct light emanating from the source, and all other components added to the light source for a desired aesthetic appearance must all be designed to withstand the heat generated by these light sources. Additionally, many of these lights are designed for use under environmental conditions which are extremely harsh and that can damage many of the surrounding components associated with the light source assembly.

Examples of use for new light sources are projector lamps, automotive headlamps, table lamps, floor lamps, and architectural lighting systems utilizing halogen bulb technology and high watt/high temperature lasers. Exterior lighting for street lights, area lights for building grounds, lighting for airports and runways, and even lighting for many indoor and outdoor facilities such as sports arenas, stage, studio, and parks are starting to utilize halogen technology and low pressure arc lamps ($X_c$ example) as well as other alternative light sources which generate extreme heat. For example, a relatively new lighting source has a small amount of sulfur and an inert argon gas within a bulb that is bombarded with microwave energy to produce a significant amount of light from a relatively small source that lasts for a long time. This type of bulb generates extreme amounts of heat.

In lighting industries, it is very common to include a lens cover adjacent the light source to improve the aesthetic appearance of the light as well as to somewhat diffuse the light emanating from the source. Such covers have traditionally been made from durable materials such as glass or less durable materials such as plastics which can withstand only so much heat. In high power laser applications the energy or power is so great that plastic materials and some glass materials will melt or shatter.

An additional problem with most of these light sources is that the light directing capabilities and the light diffusing capabilities are accomplished by substantially rudimentary technology or not at all. Much of the light emanating from these light sources is not fully utilized or is wasted and not directed toward a desired object or area and is not "shaped" to properly illuminate that area. Additionally, virtually all of these light sources produce a light output pattern in a somewhat uneven, discontinuous manner. Therefore, within a particular pattern or distribution of light emanating from the source, there are high intensity spots containing more light and low intensity spots containing less light. The rudimentary diffusing capabilities do not direct, shape or spread the light at all and are rather poor in providing an even and smooth distribution of light.

Currently, there are very few diffusing, light shaping or even substrated that will transmit the UV down to and below 200 nm. In photolithography and other UV light applications such as in the medical field, there is a tremendous need for highly transmissive diffusion and beam shaping.

The assignee of the present invention has invented a number of methods for producing a light diffusing and directing micro-sculpted surface structure on a substrate. These methods and apparatuses are disclosed in a number of issued patents assigned to the assignee of the present invention as well as a number of co-pending U.S. Patent Applications also assigned to the assignee of the present invention.

For example, methods for manufacturing and replicating optical components such as a master diffuser exhibiting desired light diffusing characteristics are well known. Many of these methods involve creating a master diffuser by exposing a photoresist material to a source of light and then replicating this master diffuser into one or more submasters of a more durable nature. There are also other methods of making replicas of a master diffuser which contain the optical features in the master. With each of these methods, the master diffuser is initially created optically. Submasters are created from these master diffusers utilizing a number of methods whereby the master diffuser surface is replicated into a submaster surface. These other methods are described in one or more pending U.S. applications, referenced below, which are assigned to the assignee of the present invention.

The following commonly assigned U.S. patents and pending applications disclose related methods for making and recording optical products and replicating those products so that they may be mass produced. For example, U.S. Pat. No. 5,365,354 entitled "Grin Type Diffuser Based on Volume Holographic Material," U.S. Pat. No. 5,534,386 entitled "Homogenizer Formed Using Coherent Light and a Holographic Diffuser," and U.S. Pat. No. 5,609,939 entitled "Viewing Screen Formed Using Coherent Light," all owned by the present assignee relate to methods for recording and replicating optical products. Each of these U.S. patents is incorporated herein by reference for purposes including, but not limited to, indicating the background of the present invention and illustrating the state of the art.

Related co-pending U.S. patent applications include Ser. No. 09/052,586 entitled "Method of Making Replicas While Preserving Master," Ser. No. 08/595,307 entitled "LCD With Light Source Destructuring and Shaping Device," Ser. No. 08/782,962 entitled "Apparatus for LCD Backlighting," Ser. No. 08/618,539 entitled "Method of Making Liquid Crystal Display System," Ser. No. 08/800,872 entitled "Method of Making Replicas and Compositions for Use Therewith," and Ser. No. 09/075,023 entitled "Method and Apparatus for Making Optical Masters Using Incoherent Light," Ser. No. 08/902,415 entitled "Monolithic Glass Light Shaping Diffuser and Method for Its Production," and "Non-Lambertian Glass Diffuser and Method of Making," filed Aug. 20, 1998, "Diffuser Master and Method of Manufacture," filed Aug. 20, 1998, "High Efficiency Monolithic Glass Light Shaping Diffuser and Method of Making," filed Aug. 25, 1998, "Optical Element Having an Integral Surface Diffuser," filed Aug. 25, 1998, "Vehicle Light Assembly Including a Diffuser Surface Structure," filed Aug. 25, 1998, "Passive Matrix Liquid Crystal Display," filed Aug. 25, 1998, and "Device Including an Optical Element With a Diffuser," filed Aug. 25, 1998. All the above applications are owned by the present assignee and are hereby incorporated by reference for purposes including, but not limited to, indicating the background of the present invention and illustrating the state of the art.

In addition, the assignee of the present invention has invented a number of methods for forming a diffuser structure from a substantially durable and high temperature resistant glass or optical material. The glass is cured from a sol-gel solution. A surface of the cured sol-gel glass includes an integral diffuser micro-sculpted surface structure capable of both homogenizing light passing through the glass diffuser as well as controlling directionality of the light within a particular pattern and direction. These apparatuses and methods are disclosed in the above incorporated co-pending U.S. Patent Applications recently filed in the U.S. Patent and Trademark Office. The methods include replicating the surface structure from a rubber submaster or other submaster which was previously recorded optically from a master. The surface structure can also be created mechanically by brushing, blasting or etching a surface of the sol-gel glass.

SUMMARY OF THE INVENTION

The present invention is directed to a light source assembly which includes a light source and an adjacent lens cover formed from a sol-gel material. The sol-gel lens cover has an integral diffuser micro-structure on one surface. The surface structure both evenly distributes and homogenizes light passing from the light source through the diffuser and controls the directionality of the light in a predetermined direction and distribution with high transmission throughout the electro-magnetic spectrum.

One object of the present invention is to provide a light source assembly which is capable of providing a light output having a smooth light pattern, distribution, or envelope having a consistent intensity and which is capable of controlling the directionality of the distribution of light. Another object of the present invention is to provide a light source assembly which utilizes a high temperature light source and a high temperature resistant lens cover capable of withstanding the extreme temperatures produced by the light source and having a high power damage threshold. A further object of the present invention is to provide a light source assembly wherein the lens cover incorporates an integral diffuser micro-sculpted surface structure which provides light homogenizing, directional control, and light shaping characteristics.

In one embodiment, an apparatus is provided for projecting light onto a predetermined area. The apparatus has a light source and a transparent element disposed adjacent the light source. The transparent element is made from a sol-gel material. A micro-sculpted surface structure is provided integral in a surface of the transparent element. The structure homogenizes, controls directionality of, and shapes light passing from the light source through the transparent element. The micro-structure therefore produces a homogenous, smooth, continuous pattern of light in a predetermined controlled direction and in a predetermined distribution or shape that corresponds to the area to be illuminated.

In one embodiment the micro-structure is provided integral in a first side of the transparent element facing the light source. Alternatively, the micro-structure may be provided integral in a second side of the transparent element facing away from the light source. The transparent element may also be spaced remote from the source altogether.

The light source of the apparatus may be virtually any type of light source including but not limited to ambient light, an incandescent bulb, a halogen bulb, a standard street light sodium lamp, a laser beam, or a sulfur lamp. The apparatus may be in the form of a lamp such as an area illumination lamp or any type of indoor or outdoor illumination lamp.

Alternatively, the apparatus may be in the form of a machine which utilizes a light source to illuminate a subject or a particular characteristic of the subject in order that the machine electronics can detect or sense some important aspect of the subject. In one embodiment, a sensor is disposed adjacent to the transparent element for sensing a characteristic of the subject which is disposed in an area illuminated by the light source. The sensor can be an electronic sensor which is adapted to electronically sense a characteristic of the subject or can be a video sensor adapted to sense a visual characteristic of the subject. This type of apparatus is sometimes known as a machine vision device.

The sol-gel material of the transparent element is particularly useful where the light source is of a high temperature type or wherein the subject which the apparatus is placed close to is a high temperature material such as a molten steel, or in a vacuum, etc. The apparatus is also useful particularly in extremely harsh environmental conditions such as for vehicle headlights which are exposed to periodic physical impact as well as extreme temperature and other environmental changes. Laser or maser beams or ion beams, or the like, will typically harm many types of transparent elements which are made from plastic, epoxy or polycarbonate materials. Such materials were the only ones prior to sol-gel glass diffusers capable of having an integral diffuser surface formed thereon. The transparent element included in the apparatus of the present invention easily withstands continual subjection to a laser beam.

The apparatus may be of the type where the light is first projected from the light source onto a subject or predetermined area and is then reflected back toward and through the transparent element for further use or function. Alternatively, the apparatus may also be of the type where the light is projected from the light source first through the transparent element and then onto a predetermined area to perform many different functions or applications.

These and other aspects and objects of the present invention will be better appreciated and understood when considered in conjunction with the following description and accompanying drawings. It should be understood, however, that the following description, while indicating preferred embodiments of the present invention, is given by way of illustration and not of limitation. Many changes and modifications may be made within the scope of the present invention without departing from the spirit thereof and the invention includes all such modifications.

BRIEF DESCRIPTION OF THE DRAWINGS

A clear conception of the advantages and features of the present invention, and of the construction and operation of the typical mechanisms provided with the present invention will become more readily apparent by referring to the exemplary and therefore non-limiting embodiments illustrated in the drawings accompanying and forming a part of this specification, and in which.

DETAILED DESCRIPTION OF THE PREFERRED EMBODIMENTS

The present invention is directed to various embodiments of light source assemblies and apparatuses which incorporate a sol-gel diffuser as a portion of the assembly. The light source assemblies and the apparatuses are adaptable for use under extreme conditions such as those involving a high temperature (energy) light source, illumination of high temperature objects, or extreme environmental conditions. Additionally, the inventive sol-gel diffusers can withstand laser damage thresholds of high power lasers and will provide high transmission below 200 nm.

Figure 1:
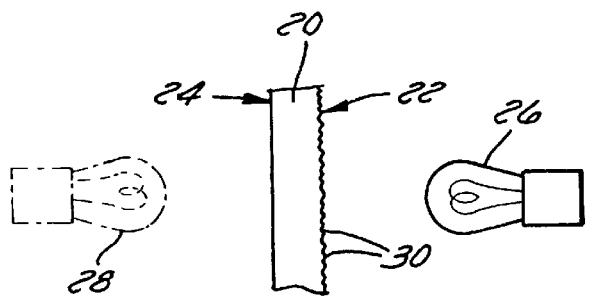
FIG. 1 illustrates a cross-section of a portion of a sol-gel transparent element of the invention including a diffuser micro-structure on one side.

Referring now to the drawings, FIG. 1 illustrates a portion of a transparent element 20 which has a first side 22 and a second side 24. A light source such as a bulb 26 is shown disposed adjacent the first side 22 and alternatively shown in phantom view as bulb 28 adjacent the second side 24. In the present embodiment, a very fine micro-sculpted surface structure is provided integral in the first side 22 of the transparent element. The micro-structure 30 is formed integral in the material of the transparent element during formation of the element by one of several novel methods noted above which are disclosed in one or more of the above noted patents and co-pending applications including co-pending U.S. patent applications Ser. No. 09/136,995 and Ser. No. 09/137,398 filed on Aug. 20, 1998. The micro-structure 30 may be formed either optically in a substrate material on one of its surfaces and then replicated into the transparent element 20 during its formation. Alternatively, the micro-structure 30 may be mechanically created via brushing, etching or blasting of a substrate on one of its surfaces and then replicating this surface into the transparent element during its formation. The present invention is not to be limited by the particular structure or method of making the micro-structure 30 integral in the transparent element 20, nor is it to be limited to the particular process by which the structures are originally formed in a master or submaster substrate.

The transparent element 20 of the invention is fabricated from a sol-gel glass material which is initially created in a liquid solution, permitted to gel and then cured to harden the gel in order to produce a very hard glass substrate of the transparent element 20. The sol-gel substrate has a substantially higher melting temperature than traditional diffuser product materials such as plastics, epoxies and polycarbonates. The co-pending U.S. patent applications Ser. No. 09/136,995 and Ser. No. 09/137/398 noted above disclose the several processes invented by the assignee of the present invention for producing the sol-gel transparent element incorporating on one surface the micro-structure 30. The disclosures of these co-pending applications are therefore incorporated herein by reference in their entirety as background to this invention. The present invention is directed to various uses of the sol-gel glass diffuser substrates, of which a number are disclosed as examples herein.

Figure 2:
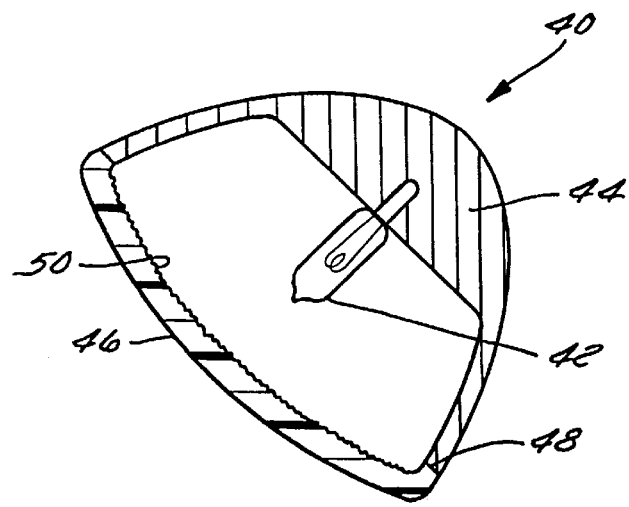
FIG. 2 illustrates a simple light source assembly constructed in accordance with the present invention.

FIG. 2 illustrates a simple exemplary view of a light source assembly 40 wherein the light source 42 such as a bulb is disposed within a housing 44 which substantially surrounds the light source. A transparent element 46 constructed from a sol-gel material is disposed over an opening 48 in the housing 44 thereby enclosing the light source 42 within the housing. The transparent element 46 includes on an inner surface thereof micro-sculpted surface structures 50 integral in the sol-gel material of the transparent element 46. By the present construction, light emanating from the source 42 will exit the housing via the opening 48 through the transparent element 46. The micro-structures 50 will perform their designated function of homogenizing, directing, and shaping the light passing through the transparent element with high transmission efficiency.

Figure 3A:
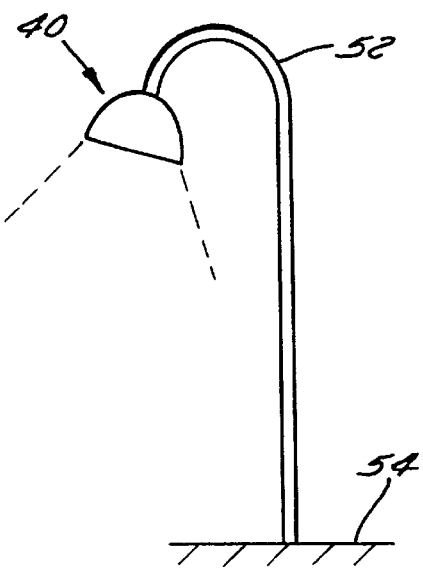
FIGS. 3a and 3b illustrates an alternative embodiments of a light source assembly constructed in accordance with present invention.
Figure 3B:
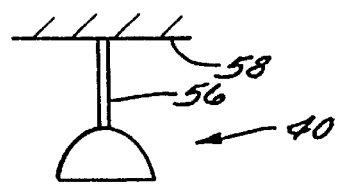

FIGS. 3a and 3b illustrate two of many possible embodiments for utilizing a light source assembly 40. In FIG. 3a, the light source assembly 40 is supported on one end of a pole 52 which is connected at its other end to a support surface 54 such as the ground. FIG. 3b illustrates the light source assembly 40 suspended on a rod or cable 56 in a hanging position from a vertical support surface 58 such as a ceiling of a building or structure. FIG. 3a illustrates an apparatus utilizing a light source assembly which is useful for many applications such as indoor floor and table lighting, street lamps, parking lot lamps, outdoor illumination lamps for buildings and building grounds, and any other such uses. The light source assembly 40 may also be mounted directly to a support surface such as the ground or a wall of a building in order to provide the same function. FIG. 3b illustrates an embodiment of utilizing the light source assembly 40 for uses such as interior lighting for buildings, stadium lighting, and other such uses. FIGS. 3a and 3b are by no means intended to limit the scope of the present invention but are merely provided to illustrate two of many possible uses for the light source assembly 40 of the invention.

Figure 4:
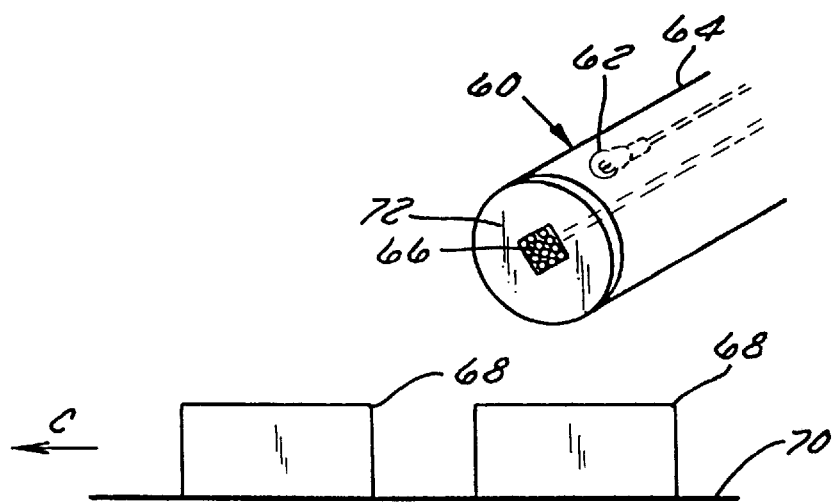
FIG. 4 illustrates an apparatus including an electronic sensor and including a sol-gel diffuser such as shown in FIG. 1.

FIG. 4 illustrates another embodiment for utilizing the sol-gel transparent element including a diffuser surface for improving quality in machine vision applications. A housing section 60 of a machine vision device (not shown) includes a light source 62 mounted within a sub-section 64 of the device 60. An electronic sensor 66 extends to the end of the housing 64 and is adapted to sense a characteristic of a particular subject such as the absence or presence of products 68 moving along a conveyor 70. In the present embodiment, a transparent element 72 in the general form of the sol-gel material diffuser 70 shown in FIG. 1 is disposed surrounding the sensor 66. The transparent element 72 permits light to pass from the source 62 through the transparent element 72 toward the products 68 traveling along the conveyor 70 in the direction of arrow "C." The transparent element 72 includes the micro-structure 30 which provides the homogenizing and directionality control functions to increase the efficiency of such a device by directing substantially all of the light toward the products 68 which are the subject of interest for the sensor 66. Furthermore, the light is distributed in a shape that corresponds to the products on the conveyor. Consequently, no light is wasted. Finally, the light emanating from the transparent element 72 is very evenly and smoothly dispersed which enhances the accuracy of the sensor by eliminating false signals created by high-intensity or low-intensity spots in the illuminated area.

In the embodiment of FIG. 4, the sensor 66 can be virtually any kind of electronic sensor, visual or video sensor, or other type of sensor without departing from the scope of the present invention. UV lithography devices, infrared sensors, bar code readers and the like can easily be adapted to incorporate such a sol-gel diffuser element. The embodiment of FIG. 4 is for illustration purposes only and intended to represent only one of many possible embodiments for using such a transparent element 72 in a machine vision application.

Figure 5:
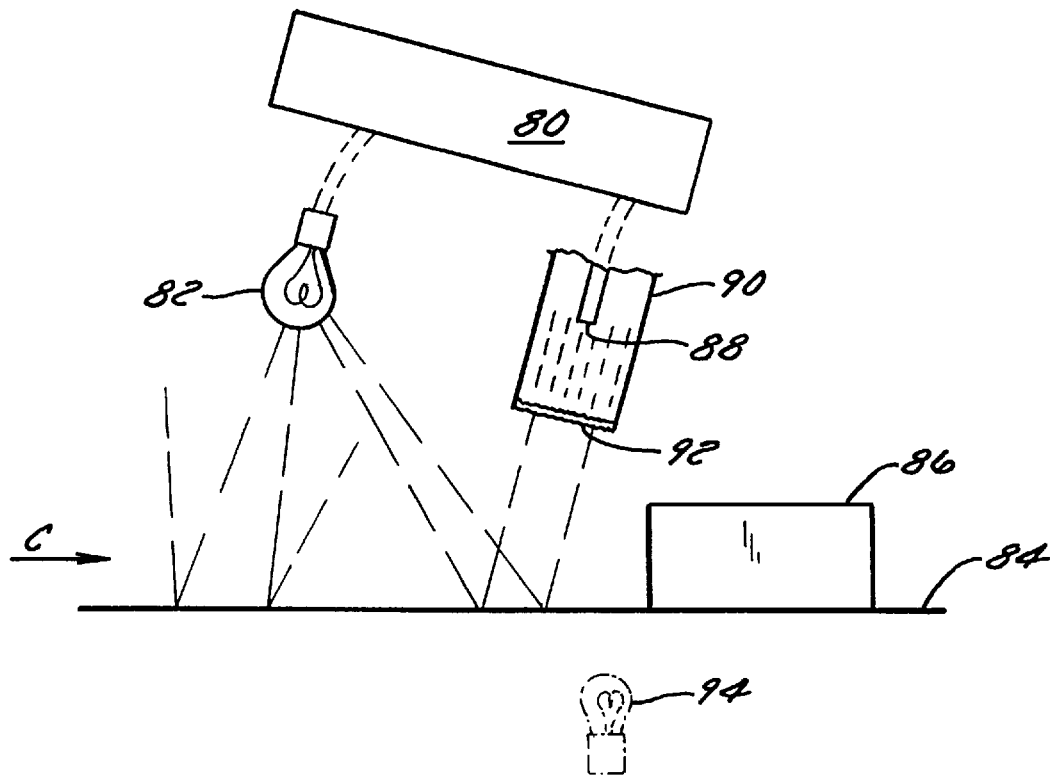
FIG. 5 illustrates an alternative embodiment of an apparatus including an electronic sensor and a sol-gel diffuser such as shown in FIG. 1.

FIG. 5 illustrates an alternative embodiment for a machine vision application. A machine is shown generally at 80 and has a light source 82 for illuminating a work area such as a conveyor 84 having a plurality of products 86 moving on the conveyor in a direction "C." A sensor 88 is disposed adjacent the conveyor 84 and is disposed within a housing 90 of the machine 80 having one end adjacent the conveyor. A transparent element 92 including the diffuser micro-structure 30 described above for the transparent element 20 is disposed on the end of the housing 90 adjacent the conveyor.

In this embodiment, light is provided by the light source 82 and directed toward the work area and then either directed back from the work area upon reflecting off the conveyor and products 86 or is absorbed by the conveyor and products. Some of the light will reflect back toward the housing 90 and the transparent element 92. The transparent element 92 will take any light passing therethrough and provide the appropriate homogenization, shaping and directionality control prior to the light hitting the sensor 88 within the housing. In particular, homogenized light having the shape of the sensor 88 will be directed toward the sensor 88. In this way light is directed only where it is needed—on the sensor. The products and/or the work area may be designed to include a particular characteristic that will reflect light differently than the remaining portions of the product and work area so that the sensor 88 can detect a particular characteristic as desired such as product orientation, product spacing or some other characteristic.

As an alternative construction, a light source 94 may be disposed somewhere below or adjacent the work area wherein light will intermittently be permitted to pass through a portion of the work area or by a product when a certain characteristic is detected. The sensor 88 can be of the form that will sense the presence or absence of light in order to determine the particular desired characteristic. The light source 94 is shown in phantom view to illustrate this alternative embodiment.

The embodiments of FIGS. 4 and 5 are similar except that the light source 62 is disposed so that light emanating therefrom will pass through the transparent element 72 prior to hitting any of the products or objects and prior to the sensor 66 performing its intended function. In the embodiment of FIG. 5, the light source 82 is disposed such that it performs its intended function prior to the light passing through the transparent element 92. The light passes through the transparent element just prior to being sensed by the sensor 88.

Figure 6:
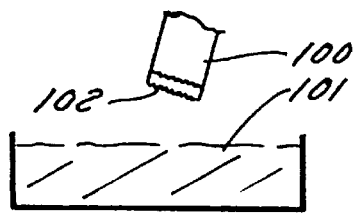
FIG. 6 illustrates a laser beam light source in conjunction with a sol-gel diffuser such as in FIG. 1.

FIG. 6 illustrates another alternative embodiment in an apparatus incorporating the construction of the present invention. In the embodiment of FIG. 6, a device 100 is provided adjacent a product or material 101 for performing an intended function. The device 100 in this embodiment can be a camera, some type of sensor, some other video device or electronic device for sensing or communicating a characteristic or data from the material 101 to a remote machine (not shown). The device 100 can also be a light source for illuminating the material 101. The device 100 includes at one end a transparent element 102 which may be in the form of a lens, a transparent cover, or other such optical element for transmitting light and/or images from the device to the material or from the material to the device. In this embodiment, FIG. 6 shows an adaptation of the invention only to illustrate this alternative embodiment and is not intended to limit the scope of the invention in any particular manner. This illustration is provided in order to show that the device 100 can have a transparent element when necessary and still be placed in an environment maintained at an elevated temperature. Typically, such devices would require a highly durable material placed adjacent the device such as glass. It was heretofore thought not possible to provide such a transparent element having the diffuser micro-structure 30 thereon. The sol-gel glass diffuser can withstand extremely high temperatures on the order of 1200° C. without being damaged. Therefore, the present invention may be placed adjacent a material maintained at an elevated temperature or placed in a high temperature or vacuum environment in order to transmit data, information or images between the device and the material.

Figure 7:
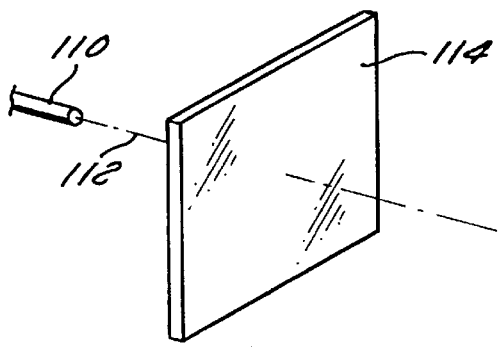
FIG. 7 illustrates a camera or other similar device incorporating a lens having a sol-gel diffuser thereon.

FIG. 7 illustrates one embodiment of a particular light source for which the present invention is particularly suited. A laser beam device 110 produces a laser beam 112 intended to perform a particular function downstream of the device, the function can vary considerably without departing from the scope of the present invention. A sol-gel glass transparent element 114 is disposed adjacent the laser device 110 so that the beam passes through the element 114 prior to performing its intended downstream function. Laser beams produce a very high level of intense energy or power thus requiring that extremely robust and durable transparent elements be used in conjunction therewith. Conventional plastics, epoxies and polycarbonates do not withstand continuous exposure to high energy laser light. Therefore, a glass material is much more suitable for such applications. However, as stated before, it was heretofore thought impossible to provide a diffuser surface structure in a glass material capable of homogenizing and shaping light passing through the glass as well as providing directional control. In this embodiment, the transparent element 114 is a sol-gel material element including the integral diffuser micro-structure 30 formed thereon similar to that disclosed for the element 20. The diffuser structure may be provided and designed to perform a particular function on the laser beam 112 and change one or more characteristics of the beam upon passing through the element.

Figure 8A:
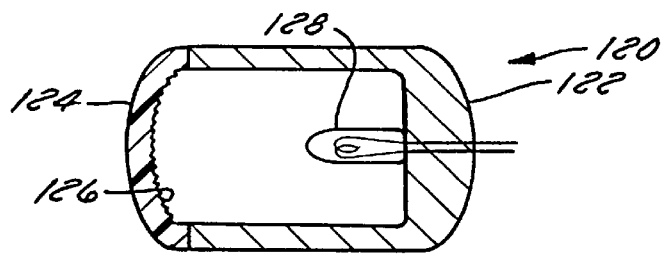
FIGS. 8a and 8b illustrate alternative embodiments of vehicle headlights incorporating a sol-gel diffuser such as in FIG. 1.
Figure 8B:
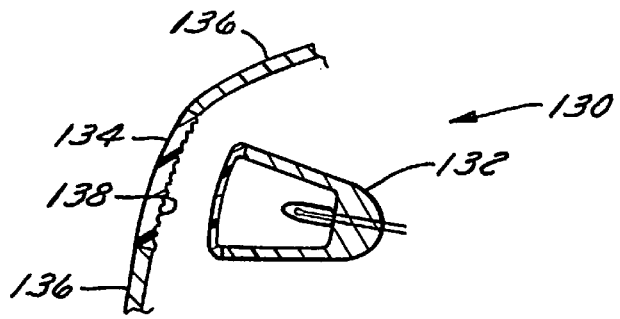

FIGS. 8a and 8b illustrate another exemplary embodiment for which a sol-gel material diffuser is particularly well suited. FIG. 8a illustrates one embodiment of an automobile headlamp assembly 120 including an enclosed housing 122 and wherein a portion of the housing is a transparent element 124 of the sol-gel glass material. The transparent element has an interior surface which includes a surface microstructure 126 formed thereon which is designed to provide the diffuser homogenization, shaping, and directionality control characteristics for this application. A high temperature light source in the form of a halogen lamp or arc lamp 128 is disposed within the housing 122 for producing a high intensity beam of light emanating from the housing through the transparent element 124. A sol-gel transparent element 124 is particularly suited for this application because it is capable of withstanding both the continuous exposure to the high temperature light source 128 as well as exposure to periodic impact from objects hitting the headlamp of a moving vehicle to which the headlamp is secured. The diffuser surface structures 126 may be adapted and designed to greatly improve the optical characteristics of the headlamp assembly 120 by homogenizing the light exiting the housing 122 as well as providing directional control and shaping so that substantially all of the light is directed toward its intended object in a predetermined pattern. In this way, very little if any light is wasted by being directed away from the intended pattern and target.

FIG. 8b illustrates another alternative headlamp assembly 130 wherein a headlamp sealed beam 132 is disposed behind a separate vehicle panel in the form of a transparent element 134 incorporated into the body panels of a vehicle 136. The transparent element 134 includes a micro-structure 138 on one of its surfaces such as the interior surface to provide directionality control, homogenization, and shaping of light emanating from the headlamp assembly 132.

Figure 9:
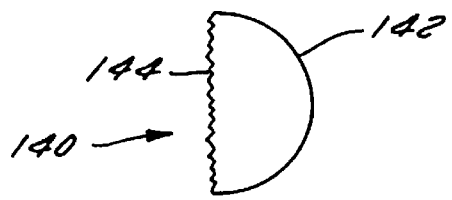
FIG. 9 illustrates a sol-gel lens constructed in accordance with the present invention.

FIG. 9 illustrates one of many possible embodiments of an optical element 140 fabricated from a sol-gel material. The element 140 is shown in the form of a lens having a curved surface 142 on one side and a microstructure 144 integral in the opposite side. The lens or optical element 140 can be used in many different applications such as in projection and imaging systems. The curved surface 142 in this embodiment can be a cylindrical or spherical lens surface. Other optical lens surfaces may also be substituted for the surface 142 without departing from the scope of the invention. The sol-gel optical element 140 is particularly well suited for use under high temperature or other adverse conditions or where light is in a wavelength range which conventional glass does not transmit but that sol-gel does transmit.

The embodiments described in detail herein are merely to illustrate several of many possible embodiments for which the invention is particularly well suited. The invention is not to be limited to just these disclosed embodiments but is intended to be useful for many other applications, apparatus' and light source assemblies wherein a transparent element in the form of a sol-gel material diffuser can be incorporated and benefit the applications apparatus or light source assembly.

Though the invention has been described referring to particular embodiments, many other changes and modifications may be made to the invention as described without departing form the spirit and scope thereof. The scope and spirit of these changes will become apparent from the appended claims. The scope of the invention is therefore intended only to limited by the appended claims.

What is claimed is:

1. An apparatus for projecting light onto a predetermined area, the apparatus comprising:
   a light source;
   a transparent element disposed adjacent the light source and being made from a sol-gel material; and
   a micro-sculpted surface structure integral in a surface of the transparent element, the micro-sculpted surface structure both homogenizing and controlling directionality of light passing from the light source through the transparent element to produce a smooth, consistent pattern of light in a predetermined direction.

2. The apparatus according to claim 1, wherein the micro-sculpted surface structure holographically recorded speckle replicated from a separate substrate in the surface of the transparent element during manufacture of the transparent element.

3. The apparatus according to claim 1, wherein the micro-sculpted surface structure is integral in a first side of the transparent element facing the light source.

4. The apparatus according to claim 1, wherein the micro-sculpted surface structure is integral in a second side of the transparent element facing away from the light source.

5. The apparatus according to claim 1, wherein the micro-sculpted surface structure is mechanically created in the surface of the transparent element during formation of the transparent element.

6. The apparatus according to claim 1, wherein the light source is one of an arc lamp and halogen lamp.

7. The apparatus according to claim 1, wherein the light source is a UV lamp.

8. The apparatus according to claim 1, wherein the apparatus is a lamp further comprising:
   a housing surrounding a portion of the light source; and
   a pole extending from a support surface to the housing supporting the housing and the light source spaced from the support surface.

9. The apparatus according to claim 8, wherein the lamp is a street lamp.

10. The apparatus according to claim 8, wherein the lamp is a parking lot lamp.

11. The apparatus according to claim 8, wherein the lamp is an outdoor illumination lamp.

12. The apparatus according to claim 1, further comprising:
   a sensor adjacent the transparent element for sensing at least one characteristic of a subject disposed in the predetermined area and illuminated by the light source.

13. The apparatus according to claim 12, wherein the sensor further comprises:
   an electronic sensor adapted to electronically sense the at least one characteristic of the subject.

14. The apparatus according to claim 12, wherein the sensor further comprises:
   a video sensor adapted to sense a visual characteristic of the subject.

15. The apparatus according to claim 12, wherein the subject is disposed near the transparent element and maintained at a significantly high temperature.

16. The apparatus according to claim 1, wherein the apparatus is a machine vision device further comprising:
   a sensor adjacent the transparent element for sensing at least one characteristic of a subject disposed in the predetermined area and illuminated by the light source.

17. The apparatus according to claim 16, wherein the subject is molten steel.

18. The apparatus according to claim 1, wherein the light source is one of a laser, high power laser, maser, ion beam, microwave beam, and x-ray beam.

19. The apparatus according to claim 1, wherein the apparatus is a headlight for a vehicle.

20. The apparatus according to claim 1, wherein light from the light source is projected onto the predetermined area and then the light is reflected from the predetermined area through the transparent element.

21. The apparatus according to claim 1, wherein light from the light source is projected through the transparent element and then onto the predetermined area.

22. A light source assembly comprising:

a light source;

a housing at least partially surrounding the light source and having an opening to permit light to exit the housing;

an at least semi-transparent cover disposed over the opening in the housing, the cover being made from a sol-gel material and having a first side disposed facing the light source and a second side facing away from the light source; and a micro-sculpted surface structure integral in a surface of the cover, the micro-structures adapted to control directionality and to homogenize light passing through the cover to produce a smooth, consistent pattern of light in a predetermined direction exiting the assembly.

* * * * *